(12) United States Patent
Suh et al.

(10) Patent No.: US 12,080,100 B2
(45) Date of Patent: Sep. 3, 2024

(54) FACE-AWARE PERSON RE-IDENTIFICATION SYSTEM

(71) Applicant: NEC Laboratories America, Inc., Princeton, NJ (US)

(72) Inventors: Yumin Suh, Santa Clara, CA (US); Xiang Yu, Mountain View, CA (US); Yi-Hsuan Tsai, Santa Clara, CA (US); Masoud Faraki, San Jose, CA (US); Manmohan Chandraker, Santa Clara, CA (US)

(73) Assignee: NEC Corporation, Tokyo (JP)

( * ) Notice: Subject to any disclaimer, the term of this patent is extended or adjusted under 35 U.S.C. 154(b) by 246 days.

(21) Appl. No.: 17/519,986

(22) Filed: Nov. 5, 2021

(65) Prior Publication Data

US 2022/0147735 A1    May 12, 2022

Related U.S. Application Data

(60) Provisional application No. 63/114,030, filed on Nov. 16, 2020, provisional application No. 63/111,809, filed on Nov. 10, 2020.

(51) Int. Cl.
| | |
|---|---|
| *G06V 40/16* | (2022.01) |
| *G06F 18/214* | (2023.01) |
| *G06V 20/52* | (2022.01) |
| *G06V 40/10* | (2022.01) |

(52) U.S. Cl.
CPC .......... *G06V 40/172* (2022.01); *G06F 18/214* (2023.01); *G06V 20/52* (2022.01); *G06V 40/103* (2022.01)

(58) Field of Classification Search
CPC .... G06F 18/214; G06V 40/172; G06V 20/52; G06V 40/103
See application file for complete search history.

(56) References Cited

U.S. PATENT DOCUMENTS

| | | | |
|---|---|---|---|
| 11,238,300 B2* | 2/2022 | Karianakis | G06V 10/82 |
| 2016/0217319 A1* | 7/2016 | Bhanu | G06V 10/754 |
| 2016/0314345 A1* | 10/2016 | Kanaujia | G06T 7/60 |
| 2017/0262736 A1* | 9/2017 | Yu | G06V 10/764 |
| 2018/0005062 A1* | 1/2018 | Aguera-Arcas | G06V 40/50 |
| 2018/0130324 A1* | 5/2018 | Yu | G08B 13/19697 |

(Continued)

OTHER PUBLICATIONS

Sales et al. Single-Shot Person Re-Identification Combining Similarity Metrics and Support Vectors, 2018, p. 250-256 (Year: 2018).*

(Continued)

*Primary Examiner* — Siamak Harandi
*Assistant Examiner* — Mehrazul Islam
(74) *Attorney, Agent, or Firm* — Joseph Kolodka

(57) ABSTRACT

A method for employing facial information in unsupervised person re-identification is presented. The method includes extracting, by a body feature extractor, body features from a first data stream, extracting, by a head feature extractor, head features from a second data stream, outputting a body descriptor vector from the body feature extractor, outputting a head descriptor vector from the head feature extractor, and concatenating the body descriptor vector and the head descriptor vector to enable a model to generate a descriptor vector.

20 Claims, 8 Drawing Sheets

(56) References Cited

U.S. PATENT DOCUMENTS

2019/0066281 A1* 2/2019 Zheng .................... G06N 3/047

OTHER PUBLICATIONS

Ge, Hongwei et al. Exploring Latent Information for Unsupervised Person Re-Identification by Discriminative Learning Networks, Mar. 2020, p. 44748-44757 (Year: 2020).*
Ge, Shimming et al. Low-Resolution Face Recognition in the Wild via Selective Knowledge Distillation, Apr. 2019, p. 2051-2060 (Year: 2019).*
Deng et al., "Image-Image Domain Adaptation with Preserved Self-Similarity and Domain-Dissimilarity for Person Re-identification", In Proceedings of the IEEE conference on computer vision and pattern recognition, May 15, 2018, pp. 994-1003.
Ge et al., "Mutual Mean-Teaching: Pseudo Label Refinery for Unsupervised Domain Adaptation on Person Re-identification", 1 arXiv:2001.01526v2 [cs.CV] Jan. 30, 2020, pp. 1-15.
Wang et al., "CosFace: Large Margin Cosine Loss for Deep Face Recognition", In Proceedings of the IEEE conference on computer vision and pattern recognition, Apr. 3, 2018, pp. 5265-5274.
Shi et al., "Towards Universal Representation Learning for Deep Face Recognition", In Proceedings of the IEEE/CVF Conference on Computer Vision and Pattern Recognition, Feb. 26, 2020, pp. 6817-6826.

* cited by examiner

FACE-AWARE PERSON RE-IDENTIFICATION SYSTEM

RELATED APPLICATION INFORMATION

This application claims priority to Provisional Application No. 63/111,809, filed on Nov. 10, 2020, and Provisional Application No. 63/114,030, filed on Nov. 16, 2020, the contents of both of which are incorporated herein by reference in their entirety.

BACKGROUND

Technical Field

The present invention relates to person re-identification and, more particularly, to a face-aware person re-identification system.

Description of the Related Art

The goal of person re-identification is to identify the same person across videos possibly recorded from different cameras. Traditional person re-identification systems require a set of training data that includes person images and their identities to train a model. However, this requires the collection of training images and annotating identities every time when applying the system to a new surveillance system. A model trained using the existing datasets can be applied to a new system, however, this usually leads to performance degradation due to the change of conditions in which videos are taken.

SUMMARY

A method for employing facial information in unsupervised person re-identification is presented. The method includes extracting, by a body feature extractor, body features from a first data stream, extracting, by a head feature extractor, head features from a second data stream, outputting a body descriptor vector from the body feature extractor, outputting a head descriptor vector from the head feature extractor, and concatenating the body descriptor vector and the head descriptor vector to enable a model to generate a descriptor vector.

A non-transitory computer-readable storage medium comprising a computer-readable program for employing facial information in unsupervised person re-identification is presented. The computer-readable program when executed on a computer causes the computer to perform the steps of extracting, by a body feature extractor, body features from a first data stream, extracting, by a head feature extractor, head features from a second data stream, outputting a body descriptor vector from the body feature extractor, outputting a head descriptor vector from the head feature extractor, and concatenating the body descriptor vector and the head descriptor vector to enable a model to generate a descriptor vector.

A system for employing facial information in unsupervised person re-identification is presented. The system includes a memory and one or more processors in communication with the memory configured to extract, by a body feature extractor, body features from a first data stream, extract, by a head feature extractor, head features from a second data stream, output a body descriptor vector from the body feature extractor, output a head descriptor vector from the head feature extractor, and concatenate the body descriptor vector and the head descriptor vector to enable a model to generate a descriptor vector.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
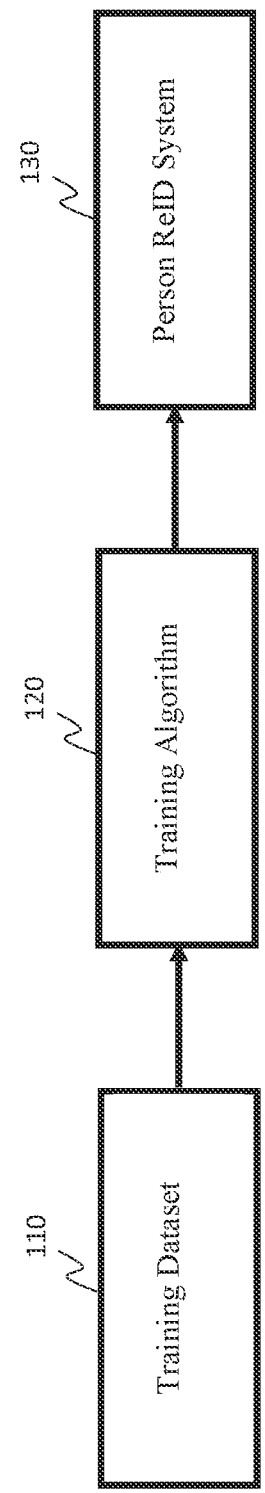
FIG. 1 is a block/flow diagram of an exemplary person re-identification pipeline.

Facial appearance provides an important cue for person identification. Facial appearance offers complementary information to clothes, which is used in existing person re-identification methods. In recent years, person re-identification methods have shown significant progress. However, person re-identification is rarely studied for how to use facial information for person re-identification. One reason is that faces are usually small and exhibit low-resolution in surveillance cameras. For instance, the head areas in many existing datasets only span smaller than about 50×50 pixels, in which such information may be easily ignored by existing methods, e.g., blurring the face regions only results in small accuracy drop, implying that facial information is rarely exploited in recent re-identification models and datasets.

However, this does not imply that the head area is not useful, but instead, it could be an important cue for more challenging re-identification tasks, such as a person with clothing changes, in which most of the existing models achieve lower accuracy under this setting. This shows that there remains room to improve the performance when the facial information is engaged. Together with the recent trend that resolution of surveillance videos become higher, it is a promising direction to study how to jointly leverage body and face appearances together.

The exemplary embodiments introduce a method for how to use facial information for person re-identification. A practical setting of unsupervised domain adaptation is assumed, where there is a labeled source domain dataset and an unlabeled target domain dataset. The exemplary methods use face recognition engines during training the model, so that the model can better exploit the face information when it is visible in images. To this end, the exemplary methods introduce a two-stream network that processes body and head images separately in each stream, aiming to use both body and head appearances together. By separating the head stream, the exemplary methods focus only on the head regions regardless of clothing and learn better head descriptors, which allow the model to encode complementary information to the body stream.

Then, the exemplary methods use a face recognition model to generate highly reliable pseudo labels on the face-visible subset of the target domain images. This step adapts the head stream using the additional pseudo-label-based loss. Finally, the exemplary methods propose to use a cross-task consistency as a self-supervision during training to enhance the body stream using head features and vice versa. When combined with the face knowledge distillation loss, it significantly improves the performance from the baseline that only uses body images, where the body features are enhanced and more importantly it is benefited from facial representations.

The exemplary methods introduce a framework to exploit face information to improve unsupervised person re-identification. The exemplary methods employ the two-stream network where each stream extracts features for body and head regions, respectively. On top of the two-stream network, the exemplary methods develop two schemes to exploit face information. First, a cross-modal consistency loss is introduced that preserves the relation between images across two modalities. Second, an additional face recognition loss is employed to train the face stream of the model. The exemplary methods generate pseudo labels for target domain images when frontal faces are visible, by using a face recognition engine.

Since it is assumed that the facial region includes sufficient information for identification, while most of the existing person re-identification datasets have facial regions with small areas, the exemplary embodiments instead use datasets that include faces with sufficiently large areas. Specifically, the exemplary embodiments employ the in-the-wild people identification dataset, PIPA, and VC-Clothes, which is a re-identification dataset with clothing changes.

The People In Photo Albums (PIPA) dataset is originally proposed for the task of recognizing peoples' identities in photo albums in an unconstrained setting. The dataset is collected from public Flickr photo albums. It includes high quality images of over 60,000 instances of 2 k identities.

VC-Clothes includes 19,060 images and has 512 identities collected from 4 cameras. There are 9 images per camera for each identity in average. Following the test protocol from the authors, the exemplary methods used 256 identities for training and the remaining 256 identities for testing. The exemplary methods used the provided split of training and testing from the authors, e.g., 9,449 images for training, 1,020 and 8,591 images for query and gallery, respectively. This dataset includes clothing changes with for each person, thus assuming a challenging setting for person re-identification.

In sum, the advantages of the exemplary embodiments are summarized as follows:

Employing a framework for unsupervised person re-identification that jointly uses body and face appearances. To leverage the complementary information from body and head appearances, the exemplary methods employ a two-stream network to enable the mutual learning between the two streams, which enhances both features and leads to superior performance. The exemplary methods further train a head stream to represent head regions regardless of the head pose. This allows the model to explicitly use facial information in a general surveillance setting where the face may not always be visible.

The exemplary methods further adopt the two-stage framework used for unsupervised domain adaptation. At a first stage, a model is trained using the labeled source domain data. At a second stage, pseudo labels are assigned to the unlabeled samples in the target domain. To assign pseudo labels, features of all the unlabeled samples are extracted using the pre-trained model. Clustering is performed over features and cluster indices are used as the pseudo labels. Then, two processes are alternated until the model converges, that is, the model parameters are updated to minimize the pseudo loss on the target domain and the pseudo labels are updated by clustering the samples in the target domain using the features extracted from the updated model.

The overall training procedure is described in Algorithm 1, reproduced below.

ALGORITHM 1

Training procedure

Require:
    Pretrain weights for head and body sub-networks, p
1: Initialize each sub-network using the pretrained weights on
    the source domain.
2: repeat
3:   Generate pseudo labels $\{y_x\}_x \in x_t$ by clustering features
4:   Compute loss on the target domain using pseudo labels
5:   Update the model parameters
6: until convergence The exemplary methods study the framework that exploits a face recognition engine to improve the training of a model for unsupervised person re-identification. Given the labeled data $S=\{X_s, Y_s\}$ from the source domain and the unlabeled data $T=\{X_t\}$ from the target domain, the exemplary methods aim to learn a model that represents an image using both body and head appearances.

Especially for the head stream, the exemplary embodiments aim at learning a model that can take a head image from an arbitrary input, so that it can generate features for both cases when faces are visible or not. At the same time, such a model is still expected to generate features that can discriminate identities when faces are visible. To this end, the exemplary methods propose to train the two-stream network using two losses, cross-task consistency loss and face knowledge distillation loss, in addition to the original pseudo label losses computed for individual streams.

The exemplary methods first introduce the proposed model architecture, then the two losses adopted for the training are described, and finally, the detailed training procedure is explained for unsupervised person re-identification.

Figure 5:
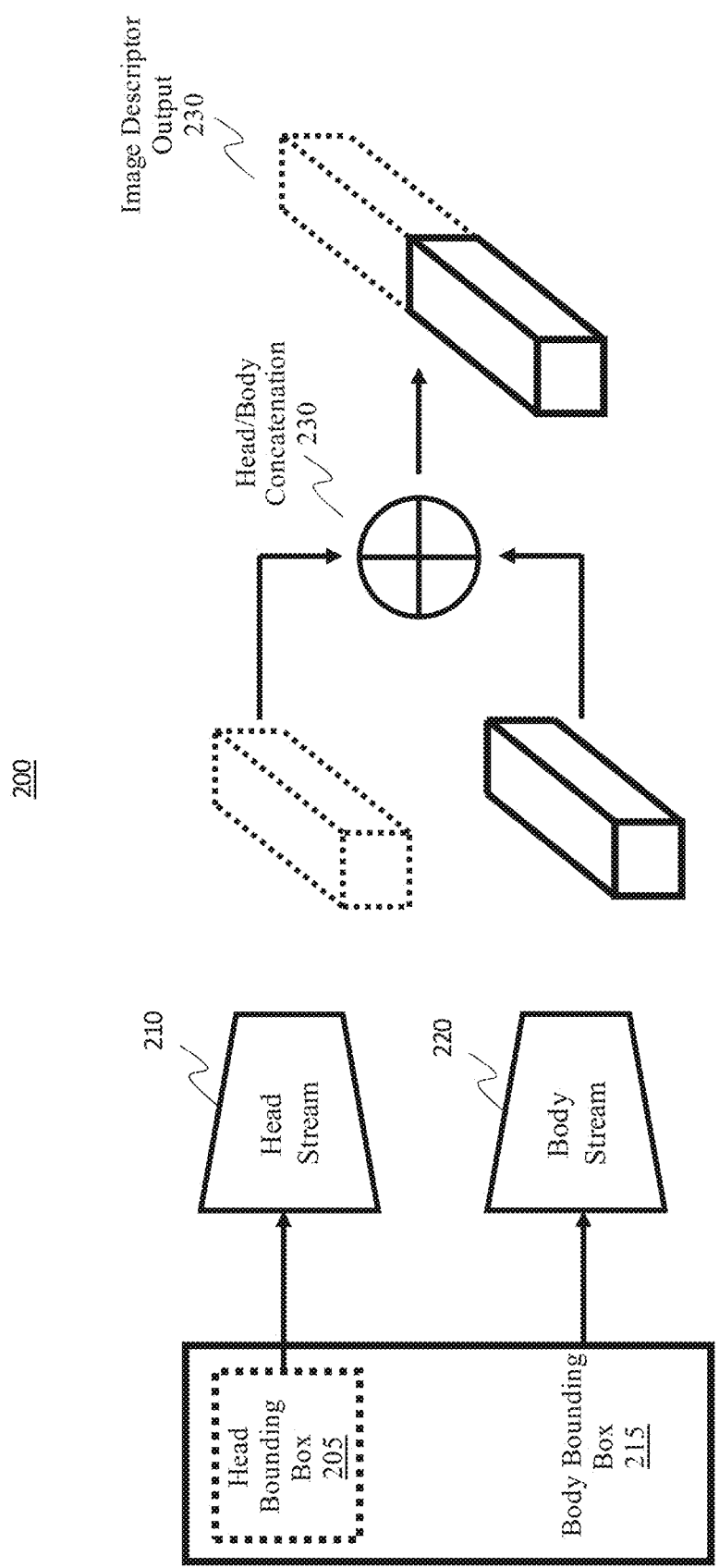
FIG. 5 is a block/flow diagram of an exemplary two-stream network including two sub-networks, in accordance with embodiments of the present invention.

Regarding the model architecture, the proposed model is a two-stream network that includes two separate sub-networks, that is, a body feature extractor 210 and a head feature extractor 220 (FIG. 5). The model takes image x and head bounding box b as inputs and outputs a face-aware representation φ(x) as illustrated in FIG. 5. The body feature extractor $\varphi_b$ extracts a feature of the whole image. The head feature extractor $\varphi_f$ first crops the image around the head and extracts features only using the cropped region. The final feature is represented as the concatenation of features from the two streams, e.g., φ(x)=[$\varphi_b$(x), $\varphi_f$(x)].

Regarding preserving cross-talk consistency, two images are considered in the target domain dataset. If two samples belong to the same cluster based on the head feature-based clustering, then it should be also clustered into the same cluster based on the body feature based clustering and vice versa. Based on this assumption, the method uses cross-task features and label combinations to generate the new pseudo label losses.

In other words, the exemplary methods use pseudo labels, $\{y_x^h\}_{x \in X}$, which are generated by clustering the head features, to compute the pseudo label loss for training the body feature extractor. Similarly, the exemplary methods use pseudo labels, $\{y_x^b\}_{x \in X}$, which are generated by clustering the body features, to compute the pseudo label loss for training the head feature extractor.

These additional training losses implicitly encourage the cross-task consistency between the two tasks, that is, head and body-based recognition.

The overall training procedure is described in Algorithm 2, reproduced below.

ALGORITHM 2

Training procedure

Require:
    Pretrain weights for head and body sub-networks, p
1: Initialize each sub-network using the pre-trained weights on the source domain.
2: repeat
3:    Generate pseudo labels $\{y_x^b\}_{x \in x_t}$ by clustering body features
4:    Generate psuedo labels $\{y_x^h\}_{x \in x_t}$ by clustering head features
5:
6:    Compute loss for the body-stream on the target domain using pseudo labels $\{y_x^b\}_{x \in x_t}$
7:    Compute loss for the head-stream on the target domain using pseudo labels $\{y_x^h\}_{x \in x_t}$
8:
9:    Compute loss for the body-stream on the target domain using pseudo labels $\{y_x^h\}_{x \in x_t}$
10:   Compute loss for the head-stream on the target domain using pseudo labels $\{y_x^b\}_{x \in x_t}$
11:
12:   Update the model parameters
13: until convergence Regarding face knowledge distillation, a face recognition model is considered that can distinguish identities for given face images when faces are visible. Since it is not guaranteed that the faces are always visible in general person images, the exemplary embodiments aim at learning a general head feature extractor that can take head images captured in arbitrary angles, while preserving the similarity relations obtainable from a face recognition model when faces are visible in samples.

To this end, the exemplary embodiments distill the knowledge obtained from a face recognition engine on the target domain to the head sub-network of the model. The exemplary methods first run a face detector to all the images of the target domain to find the subset of images V that include face-visible images. Then, the exemplary methods extract face-based features for all the images in V. Finally, the exemplary methods perform clustering to generate pseudo labels $\{y_x^f\}_{x \in V}$.

The exemplary embodiments use this faced-based pseudo label $\{y_x^f\}_{x \in V}$ to compute the additional pseudo label loss for training the head feature extractor. Training the head feature extractor using the joint faced-based pseudo label loss and the original head-based pseudo label loss enables the network to handle head images from arbitrary angles, while guiding to discriminate identities more accurately using the face information when faces are visible.

Since these pseudo labels are generated for only a subset of a target training set, it may cause the network to overfit to specific samples. To avoid this, the exemplary methods apply this loss in a stochastic way. In other words, the face knowledge distillation loss is applied randomly at each iteration with probability p. Empirically, this strategy helps avoid the overfitting issue.

The final training algorithm using both cross-task consistency loss and face knowledge distillation loss is described in Algorithm 3, as reproduced below.

ALGORITHM 3

Training procedure

Require:
    Pretrain weights for head and body sub-networks, p, face-based pseudo labels $\{y_x^f\}_x \in v$
1: Initialize each sub-network using the pretrained weights on the source domain.
2: repeat
3:    Generate pseudo labels $\{y_x^b\}_x \in x_t$ by clustering body features
4:    Generate pseudo labels $\{y_x^h\}_x \in x_t$ by clustering head features
5:
6:    Compute loss for the body-stream on the target domain using pseudo labels $\{y_x^b\}_x \in x_t$
7:    Compute loss for the head-stream on the target domain using pseudo labels $\{y_x^h\}_x \in x_t$
8:
9:    Compute loss for the body-stream on the target domain using pseudo labels $\{y_x^h\}_x \in x_t$
10:   Compute loss for the head-stream on the target domain using pseudo labels $\{y_x^b\}_x \in x_t$
11:
12:   Random sample u ~ U[0, 1]
13:   if u < p then
14:      Compute loss for the head-stream on the target domain using pseudo labels of the face-visible subset V, i.e., $\{y_x^f\}_x \in v$
15:   end if
16:
17:   Update the model parameters
18: until convergence Regarding the detailed training procedure, the exemplary embodiments first pre-train each sub-network using the source domain data and use them as the initialization to start the overall training process, including pseudo-label-based loss functions on either the head or body. For pseudo-label generation, the exemplary methods use the clustering method on either the head or body features.

For the loss, given an input x, pseudo label y and the class centroids W, the exemplary methods use the joint loss including four terms following mutual mean-teaching (MMT).

$$\ell_{da}(x,y,W) = \ell_{ce}(x,y,w) + \ell_{sce}(x,y,w) + \ell_{tri}(x,y) + \ell_{stri}(x,y)$$

It includes cross-entropy loss, $\ell_{ce}$, soft cross-entropy loss, $\ell_{sce}$, triplet loss, $\ell_{tri}$, and soft triplet loss $\ell_{stri}$.

Temporal weight averaging is also used in mutual learning-based unsupervised domain adaptation to average the network parameters over iterations. Temporal weight averaging achieves high performance for unsupervised person re-identification. Formally, the exemplary methods keep the parameter $\bar{\theta}$ separately from the model parameter $\theta$ during the training. At t-th training iteration, it is updated by the average of $\bar{\theta}$ and the current $\theta$ weighted by the hyper-parameter $\alpha$, e.g., $\bar{\theta} \leftarrow \alpha\bar{\theta}+(1-\alpha)\theta_t$, where the current parameters $\theta$ is updated to minimize the training loss. In all the algorithms, the exemplary methods use the temporally averaged parameters to extract features for generating pseudo labels.

In conclusion, the exemplary embodiments present a method that can exploit face information for person re-identification under the standard unsupervised domain adaptation setting. One straightforward way to achieve this is to apply a face recognition engine following face detection. However, it is not applicable when faces are invisible in a non-frontal view or becomes unreliable when faces are captured in low resolution, making it unsuitable for a general surveillance setting. To alleviate this issue, the exemplary methods introduce a framework that jointly uses body and head appearances. Specifically, the exemplary methods employ a two-stream network that processes body and head regions in each stream. The exemplary methods then distill the reliable face-based knowledge to the head stream, while enforcing these features to be invariant to head viewpoints, so that it is applicable to images captured from arbitrary angles. In addition, to further exploit the complementary information between head and body, the exemplary methods introduce mutual learning of the two streams under a constraint of generating consistent cross-task predictions.

FIG. 1 is a block/flow diagram of an exemplary person re-identification pipeline.

Training images 110 are used as input to a training algorithm 120 that updates the parameters of the system based on the input training data. After training, the person re-identification system 130 can be used on unseen images.

Regarding the training dataset(s) 110, training data for person re-identification includes a set of person images, along with the identity annotations.

Regarding the training algorithm 120, the model is a deep neural network which has parameters that need to be adjusted based on the given training data. A loss function is defined so that the difference between ground truth and the current model's predictions is measured for a given image of the training data. Then, the model parameters can be updated in a direction that reduces the loss using optimization techniques, such as stochastic gradient descent (SGD).

Regarding the person re-identification system 130, after adjusting the parameters of the neural network model using the training data 110, the system is ready to be applied on new images. The person re-identification system 130 represents each image as a vector. Given a query image, the system 130 compares distances to all the images in the database and retrieves the ones with the smallest distances.

Figure 2:
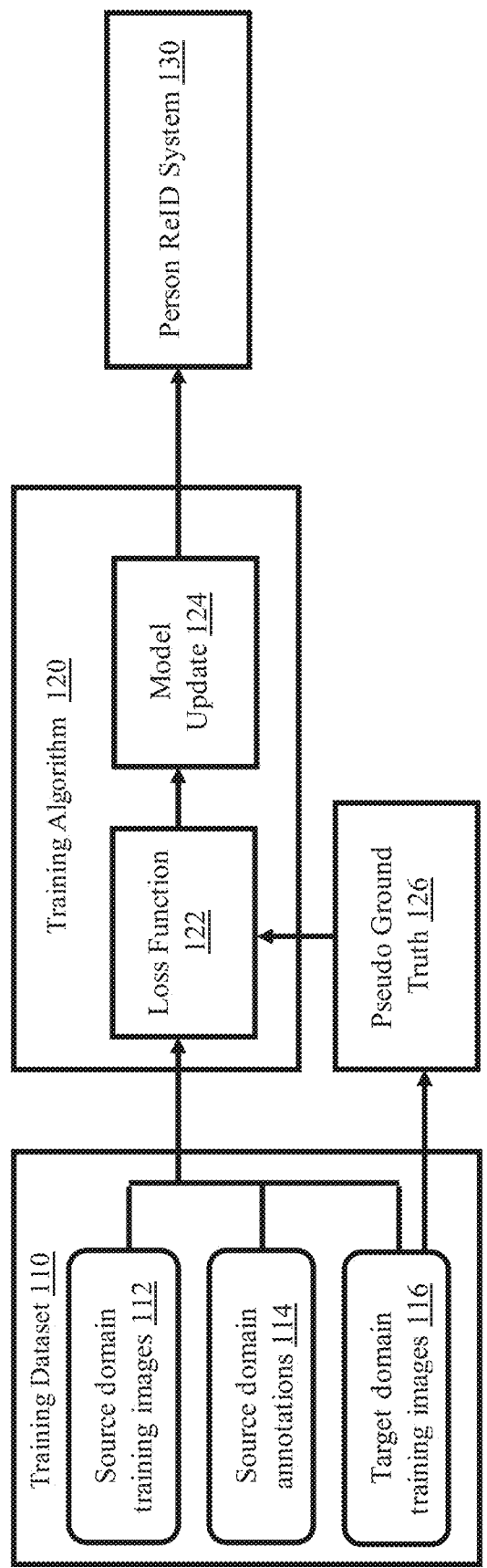
FIG. 2 is a block/flow diagram of an exemplary training procedure for unsupervised person re-identification.

FIG. 2 is a block/flow diagram of an exemplary training procedure for unsupervised person re-identification.

Given source domain training images 112 along with source domain annotations 114, loss 122 is computed to update model 124. In addition, pseudo label loss on the target domain is computed by using the target domain training images 116 and the corresponding pseudo ground truth 126. Finally, the model is updated to minimize the summation of the two losses.

Figure 3:
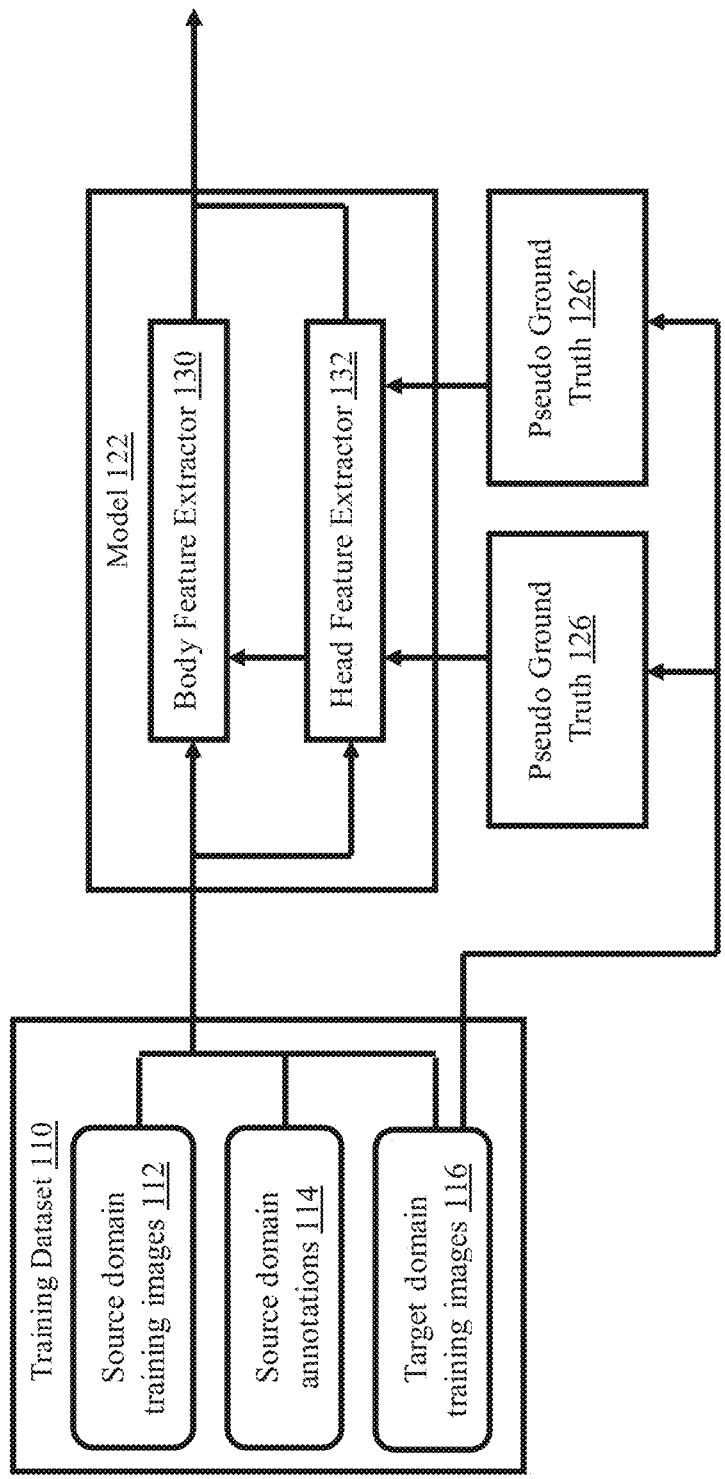
FIG. 3 is a block/flow diagram of an exemplary training procedure for unsupervised person re-identification where the model is a two-stream network, in accordance with embodiments of the present invention.

FIG. 3 is a block/flow diagram of an exemplary training procedure for unsupervised person re-identification where the model is a two-stream network, in accordance with embodiments of the present invention.

The proposed pipeline differs from the previously shown standard pipeline for person re-identification in two aspects. First, the model is a two-stream network, where body features and head features are extracted from each stream. Body feature extractor 130 takes body image as an input and outputs the body descriptor vector. Head feature extractor 132 takes images around the head region as an input and outputs the head descriptor vector. Given an image, the model 122 generates its descriptor vector by concatenating body and head features (FIG. 5). Second, the model is trained using face-based pseudo labels 126' in addition to body-based and head-based pseudo labels 126. Specifically, face-based pseudo label loss is used to train the head feature extractor 132.

Figure 4:
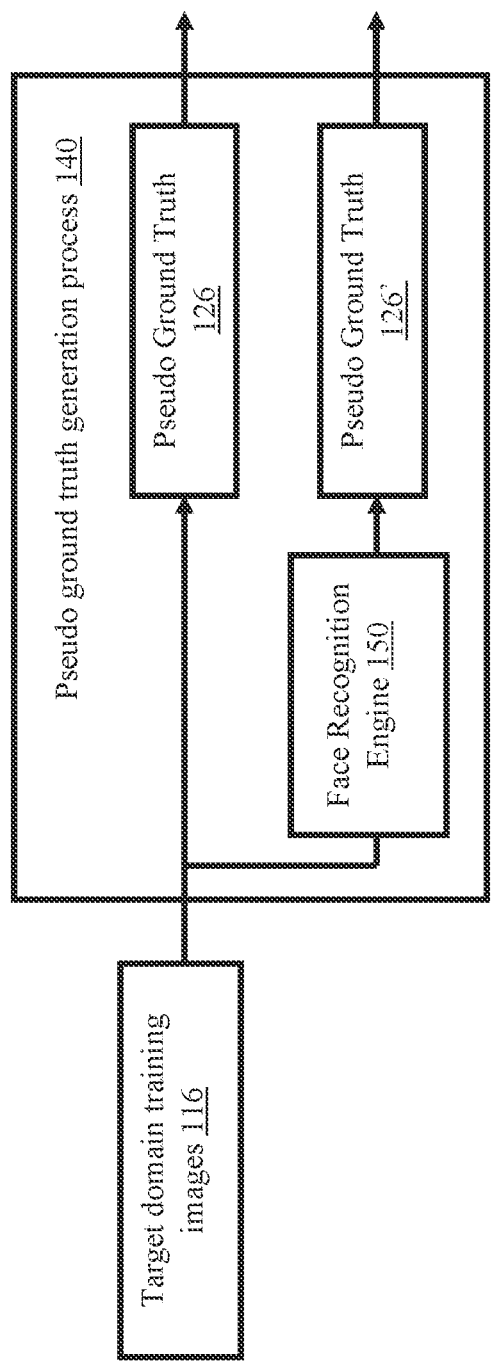
FIG. 4 is a block/flow diagram of an exemplary pseudo ground truth generation process, in accordance with embodiments of the present invention.

FIG. 4 is a block/flow diagram of an exemplary pseudo ground truth generation process, in accordance with embodiments of the present invention.

FIG. 4 describes details of the pseudo ground truth generation process 140. In addition to the pseudo ground truth generation procedure 126, the system generates pseudo labels 126' for a subset of images where frontal faces are visible, using the face recognition engine 150.

Therefore, the exemplary embodiments introduce a framework that exploits automatically generated noisy labels on the target domain using the face recognition engine. This approach does not require additional annotation on the target domain, while achieving higher performance by exploiting the face recognition engines and large datasets for face recognition. To this end, the exemplary methods employ the two-stream network where each stream extracts features for body and head regions, respectively. On top of the two-stream model, the exemplary methods develop two schemes to exploit face information.

First, the exemplary methods design the cross-modal consistency loss which uses self-supervision to train a model in the target domain. Specifically, the loss enforces to preserve the relation between images across two modalities. For example, if two images, A and B, from the target domain have similar head features, then their body features are constrained to be similar. If the distance between head features of two images, C and D, is large, then their body features are constrained to be distant from each other.

Second, the exemplary methods employ additional face recognition loss to train the face stream of the model. To this end, the exemplary methods generate pseudo labels for target domain images when frontal faces are visible, using the face recognition engine. Thanks to accurate face recognition, it can improve both body and head features through the cross-modal consistency loss.

FIG. 5 is a block/flow diagram of an exemplary two-stream network 200 including two sub-networks, in accordance with embodiments of the present invention.

The two-stream network includes two sub-networks 210, 220. Head and body sub-network 210, 220 (or feature extractors) take head and body bounding boxes 205, 215 as inputs, respectively. Head and body features are concatenated (230) to output the final image descriptor 240.

Figure 6:
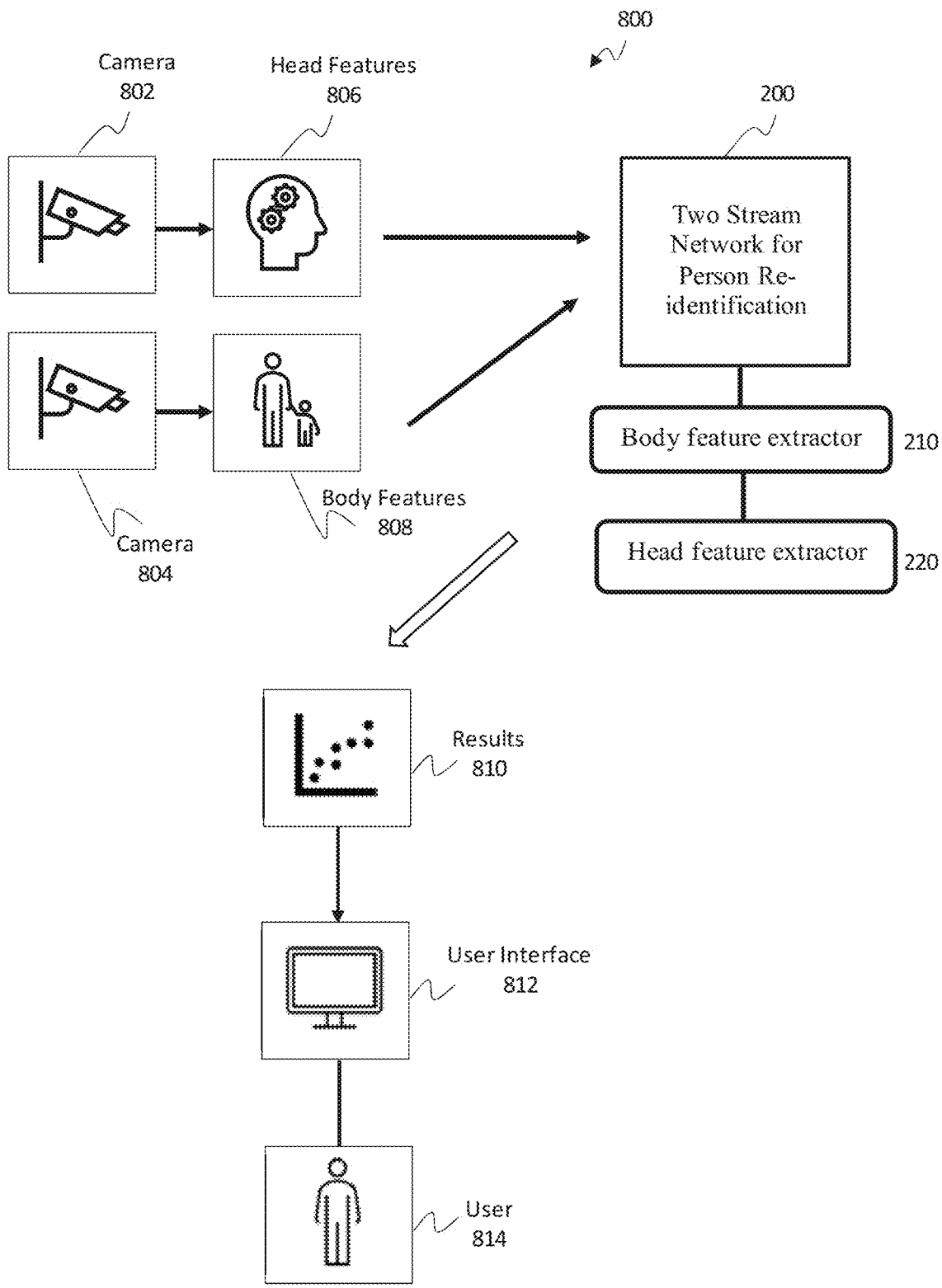
FIG. 6 is an exemplary practical application for employing facial information in unsupervised person re-identification, in accordance with embodiments of the present invention.

FIG. 6 is a block/flow diagram 800 of a practical application for employing facial information in unsupervised person re-identification, in accordance with embodiments of the present invention.

In one practical example, a first camera 802 can detect a head shot 806 and a second camera 804 can detect body features 808. The head features 806 and the body features 808 are processed by the two-stream network for person re-identification 200 by employing a body feature extractor 210 and a head feature extractor 220. The results 810 (e.g., person of interest) can be provided or displayed on a user interface 812 handled by a user 814.

Figure 7:
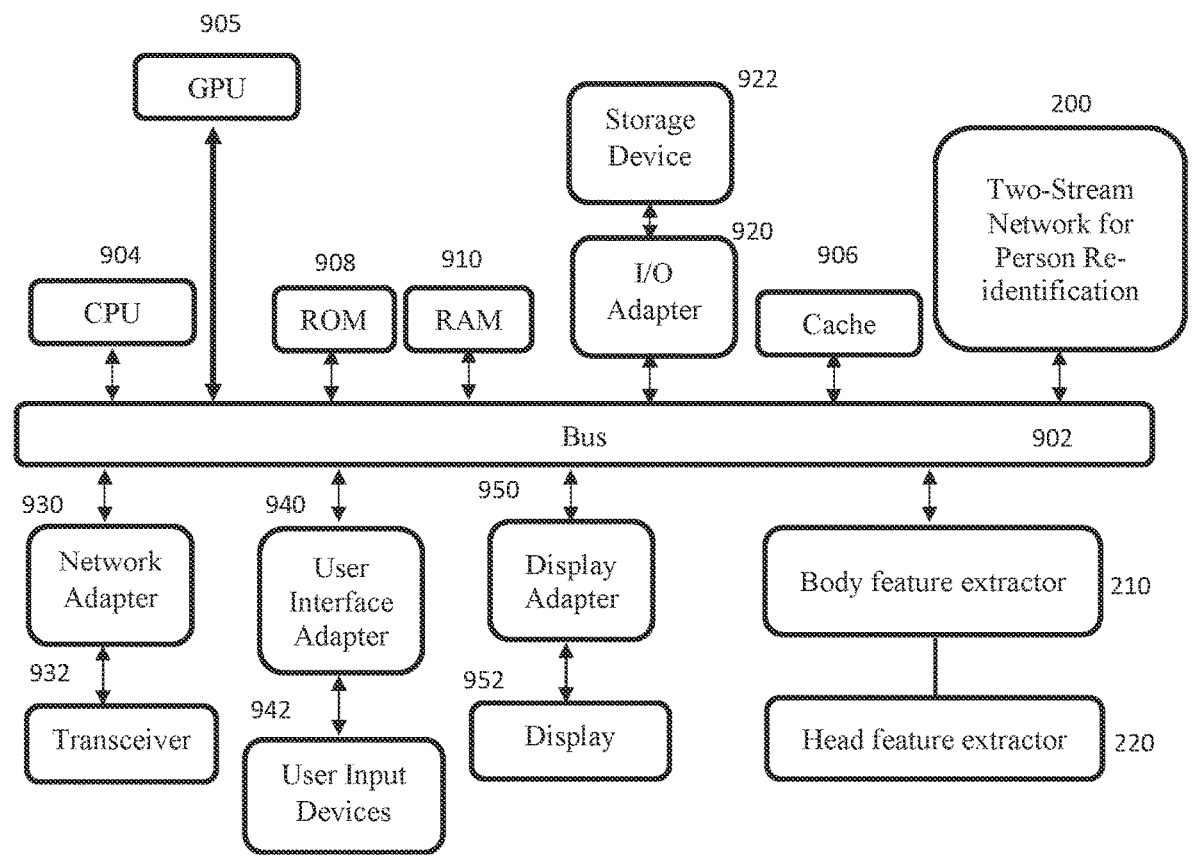
FIG. 7 is an exemplary processing system for employing facial information in unsupervised person re-identification, in accordance with embodiments of the present invention.

FIG. 7 is an exemplary processing system for employing facial information in unsupervised person re-identification, in accordance with embodiments of the present invention.

The processing system includes at least one processor (CPU) 904 operatively coupled to other components via a system bus 902. A GPU 905, a cache 906, a Read Only Memory (ROM) 908, a Random Access Memory (RAM) 910, an input/output (I/O) adapter 920, a network adapter 930, a user interface adapter 940, and a display adapter 950, are operatively coupled to the system bus 902. Additionally, the two-stream network for person re-identification 200 can be employed by using a body feature extractor 210 and a head feature extractor 220.

A storage device 922 is operatively coupled to system bus 902 by the I/O adapter 920. The storage device 922 can be any of a disk storage device (e.g., a magnetic or optical disk storage device), a solid-state magnetic device, and so forth.

A transceiver 932 is operatively coupled to system bus 902 by network adapter 930.

User input devices 942 are operatively coupled to system bus 902 by user interface adapter 940. The user input devices 942 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 942 can be the same type of user input device or different types of user input devices. The user input devices 942 are used to input and output information to and from the processing system.

A display device 952 is operatively coupled to system bus 902 by display adapter 950.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 8:
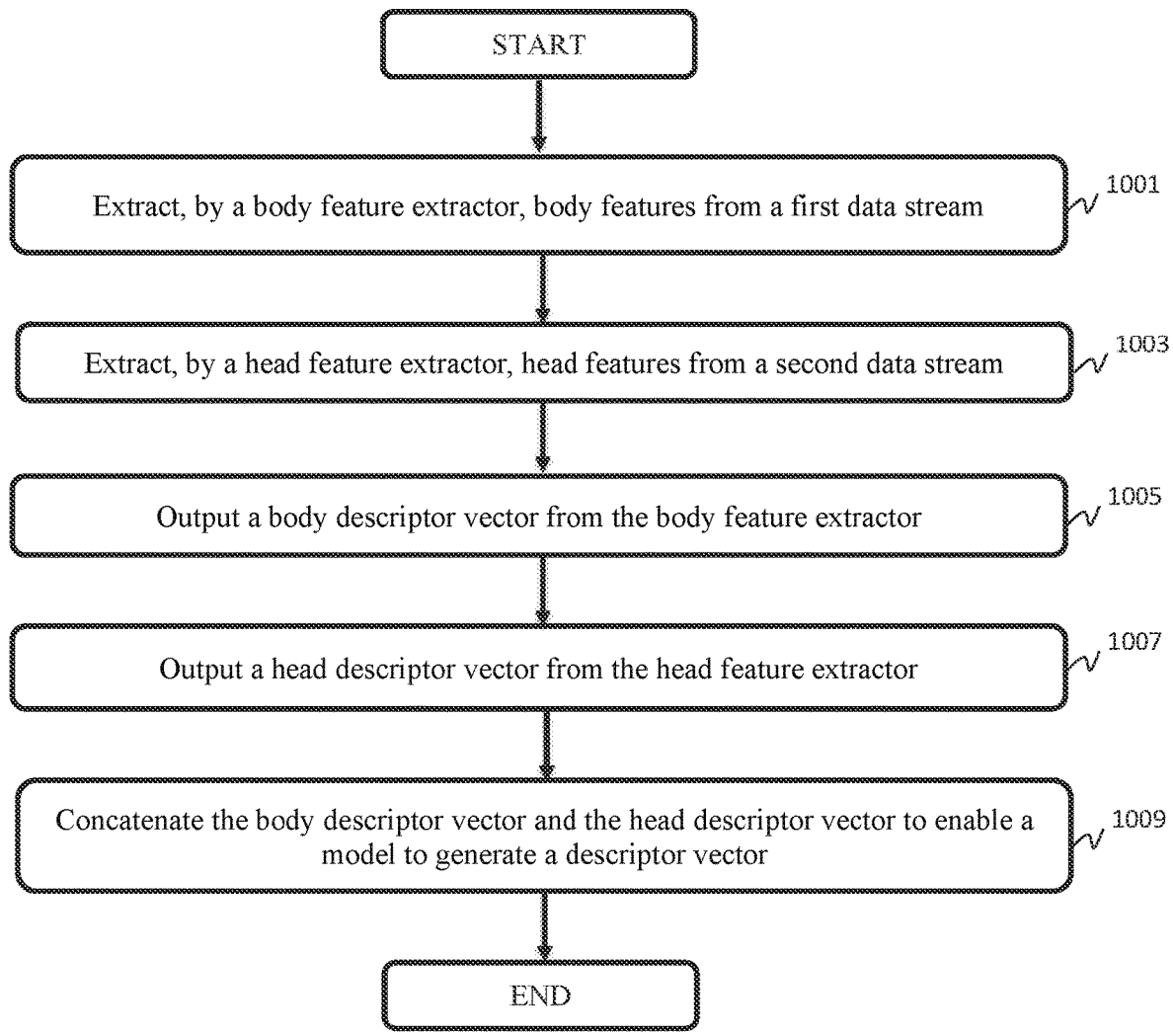
FIG. 8 is a block/flow diagram of an exemplary method for employing facial information in unsupervised person re-identification, in accordance with embodiments of the present invention.

FIG. 8 is a block/flow diagram of an exemplary method for employing facial information in unsupervised person re-identification, in accordance with embodiments of the present invention.

At block 1001, extract, by a body feature extractor, body features from a first data stream.

At block 1003, extract, by a head feature extractor, head features from a second data stream.

At block 1005, output a body descriptor vector from the body feature extractor.

At block 1007, output a head descriptor vector from the head feature extractor.

At block 1009, concatenate the body descriptor vector and the head descriptor vector to enable a model to generate a descriptor vector.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like. Similarly, where a computing device is described herein to send data to another computing device, the data can be sent directly to the another computing device or can be sent indirectly via one or more intermediary computing devices, such as, for example, one or more servers, relays, routers, network access points, base stations, and/or the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "calculator," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for employing facial information in unsupervised person re-identification, the method comprising:
    extracting, by a body feature extractor, body features from a first data stream;
    extracting, by a head feature extractor, head features from a second data stream;
    outputting a body descriptor vector from the body feature extractor;
    outputting a head descriptor vector from the head feature extractor;
    concatenating the body descriptor vector and the head descriptor vector to enable a model to generate a descriptor vector;
    enhancing the first data stream using the head features and the second data stream using the body features by utilizing cross-task consistency as a self-supervision during training;
    training the head feature extractor using a face knowledge distillation loss being applied randomly at each iteration with a particular probability;
    employing a two-stream network where each stream processes body and head images separately, and utilizing both body and head appearances together;
    preserving a relation between images across two modalities using cross-modal consistency loss;
    employing additional face recognition loss for training the face stream of the model using pseudo labels for images from a target domain when frontal faces are visible; and
    distilling knowledge obtained from a face recognition engine on the target domain to a head sub-network of the model.

2. The method of claim 1, wherein the model is trained by using face-based pseudo labels, body-based pseudo labels, and head-based pseudo labels.

3. The method of claim 1, wherein a face-based pseudo label loss is used to train the head feature extractor.

4. The method of claim 1, wherein a cross-modal consistency loss is employed as a self-supervision during training.

5. The method of claim 1, wherein a cross-modal consistency loss is employed in tandem with a face knowledge distillation loss.

6. The method of claim 1, wherein the head feature extractor crops images from the first data stream around a head region and extracts head features by only using cropped regions.

7. The method of claim 1, wherein temporal weight averaging is used to average network parameters over iterations to extract features for generating pseudo labels.

8. A non-transitory computer-readable storage medium comprising a computer-readable program for employing facial information in unsupervised person re-identification wherein the computer-readable program when executed on a computer causes the computer to perform steps of:
- extracting, by a body feature extractor, body features from a first data stream;
- extracting, by a head feature extractor, head features from a second data stream;
- outputting a body descriptor vector from the body feature extractor;
- outputting a head descriptor vector from the head feature extractor;
- concatenating the body descriptor vector and the head descriptor vector to enable a model to generate a descriptor vector;
- enhancing the first data stream using the head features and the second data stream using the body features by utilizing cross-task consistency as a self-supervision during training;
- training the head feature extractor using a face knowledge distillation loss being applied randomly at each iteration with a particular probability;
- employing a two-stream network where each stream processes body and head images separately, and utilizing both body and head appearances together;
- preserving a relation between images across two modalities using cross-modal consistency loss;
- employing additional face recognition loss for training the face stream of the model using pseudo labels for images from a target domain when frontal faces are visible; and
- distilling knowledge obtained from a face recognition engine on the target domain to a head sub-network of the model.

9. The non-transitory computer-readable storage medium of claim 8, wherein the model is trained by using face-based pseudo labels, body-based pseudo labels, and head-based pseudo labels.

10. The non-transitory computer-readable storage medium of claim 8, wherein a face-based pseudo label loss is used to train the head feature extractor.

11. The non-transitory computer-readable storage medium of claim 8, wherein a cross-modal consistency loss is employed as a self-supervision during training.

12. The non-transitory computer-readable storage medium of claim 8, wherein a cross-modal consistency loss is employed in tandem with a face knowledge distillation loss.

13. The non-transitory computer-readable storage medium of claim 8, wherein the head feature extractor crops images from the first data stream around a head region and extracts head features by only using cropped regions.

14. The non-transitory computer-readable storage medium of claim 8, wherein temporal weight averaging is used to average network parameters over iterations to extract features for generating pseudo labels.

15. A system for employing facial information in unsupervised person re-identification, the system comprising:
- a memory; and
- one or more processors in communication with the memory configured to:
  - extract, by a body feature extractor, body features from a first data stream;
  - extract, by a head feature extractor, head features from a second data stream;
  - output a body descriptor vector from the body feature extractor;
  - output a head descriptor vector from the head feature extractor;
  - concatenate the body descriptor vector and the head descriptor vector to enable a model to generate a descriptor vector;
  - enhance the first data stream using the head features and the second data stream using the body features by utilizing cross-task consistency as a self-supervision during training;
  - train the head feature extractor using a face knowledge distillation loss being applied randomly at each iteration with a particular probability;
  - employ a two-stream network where each stream processes body and head images separately, and utilizing both body and head appearances together;
  - preserve a relation between images across two modalities using cross-modal consistency loss;
  - employ additional face recognition loss for training the face stream of the model using pseudo labels for images from a target domain when frontal faces are visible; and
  - distill knowledge obtained from a face recognition engine on the target domain to a head sub-network of the model.

16. The system of claim 15, wherein the model is trained by using face-based pseudo labels, body-based pseudo labels, and head-based pseudo labels.

17. The system of claim 15, wherein a face-based pseudo label loss is used to train the head feature extractor.

18. The system of claim 15, wherein a cross-modal consistency loss is employed as a self-supervision during training.

19. The system of claim 15, wherein a cross-modal consistency loss is employed in tandem with a face knowledge distillation loss.

20. The system of claim 15, wherein the head feature extractor crops images from the first data stream around a head region and extracts head features by only using cropped regions.

* * * * *